United States Patent Office 3,022,061
Patented Feb. 20, 1962

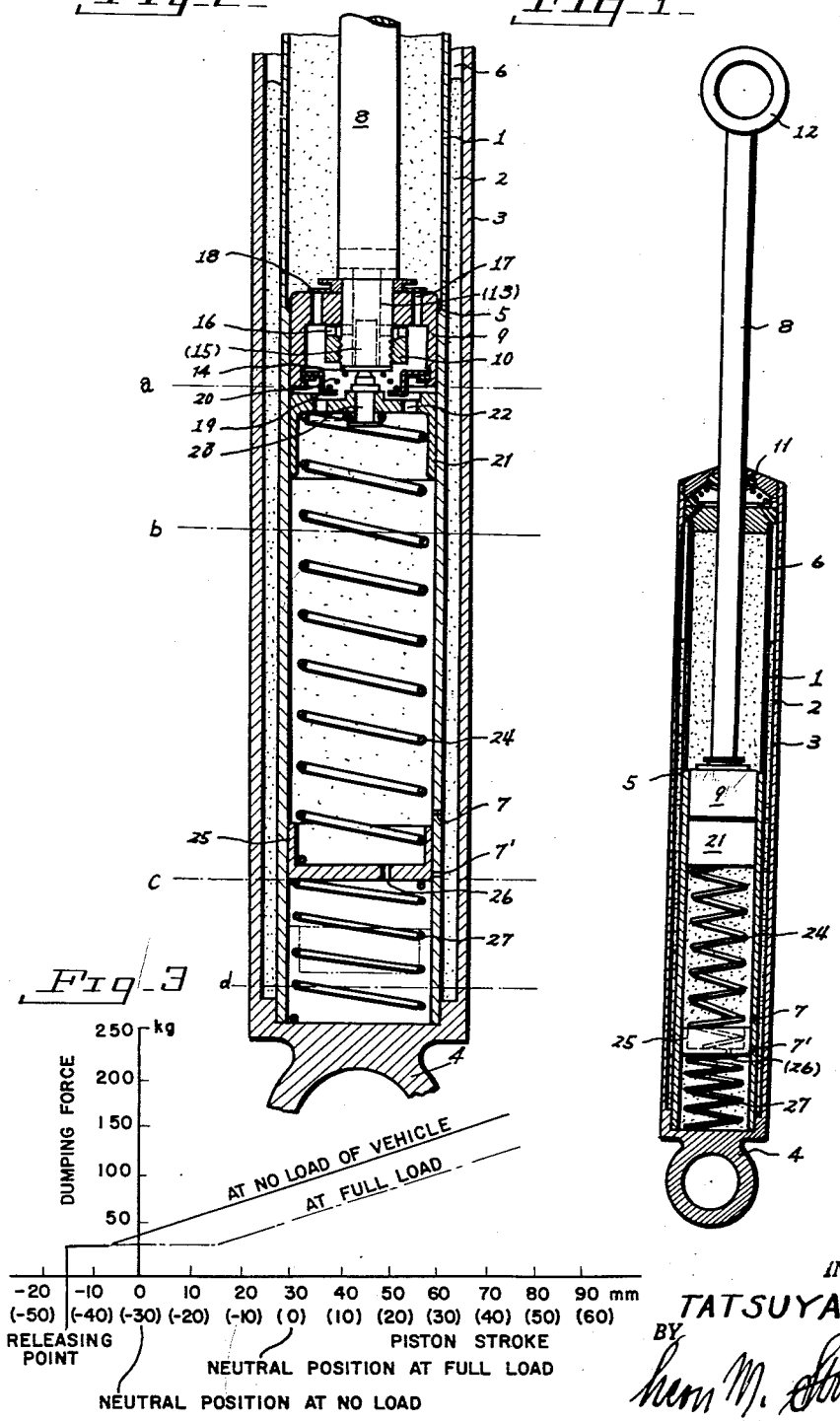

3,022,061
OIL VIBRATION-DAMPER FOR VEHICLES
Tatsuya Takagi, 46 Arebisu-machi, Nishinomiya-shi,
Hyogo Prefecture, Japan
Filed July 7, 1960, Ser. No. 41,346
Claims priority, application Japan Oct. 16, 1959
7 Claims. (Cl. 267—8)

This invention relates to an oil vibration-damper for vehicles.

It is a feature of the construction of the oil vibration-damper according to this invention that a main piston including a nonreturn valve which admits only an upward flow of oil and an oil pressure control valve which admits only a downward flow of oil, are slidably inserted into the oil cylinder. A valve spring is made to act on the said oil pressure control valve so as to maintain a given magnitude of damping force in opposition to the external force acting normally to expand. In addition, in the said oil cylinder a little distance above the bottom thereof a regulating piston having a small hole is disposed. Between the regulating piston and the bottom of the cylinder a restoring compression spring is included to form a oil damper to produce a restoring force acting upward. A compression spring is located upon the regulating piston up to the neutral position (a position on the course of a stroke when a dead weight of a vehicle and the carrying force of the supporting spring are balanced, which is to be referred as "neutral position" hereinafter). The upper end of the said compression spring is supported by means of an auxiliary piston. The compression spring is made to exert a pressure upon the pressure control valve of the main piston when the main piston abuts the said auxiliary piston, thereby producing a damping force in opposition to the external force acting to expand. The damping force gradually increases in proportion to the forced displacement when the main piston is pushed down beyond the said neutral position, while it maintains a small but uniform damping force in opposition to the external force acting to expand when the main piston is placed above the neutral position. In addition in case the neutral position is shifted due to the variation of the static loading on chassis, the regulating piston can automatically change the position to adjust the actuating point of the compression spring.

An object of this invention is to provide an improved shock absorber.

A further object of the invention is to provide a shock absorber including a piston slidable in an oil cylinder and having means for permitting flow in one direction and valve means for regulating the flow in another direction, and further including spring means biased against the valve means to close the valve in a neutral position and a regulatory piston between the spring means and the adjacent end of the cylinder and said secondary spring means biasing the regulatory piston in a direction toward the main piston.

A further object of the invention is to provide a shock absorber which is rugged in construction, simple in design and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a longitudinal section of a shock absorber constructed in accordance with the invention;

FIG. 2 is an enlarged fragmentary section similar to FIG. 1 of the shock absorber; and FIG. 3 is a graph indicating the operation characteristics of the device.

In the drawings, an outer cylinder 3 having an eyelet 4 at the lower end thereof for affixing the device to the bearing seat of the chassis, is spaced by a uniform gap 2, externally of an inner cylinder 1. The inner diameter of the cylinder 1 above the releasing point 5, at the level around the inner middle part of the cylinder, is slightly enlarged. The inner space of the cylinder and the greater portion of the gap 2, except for the upper part forming an air chamber 6, are filled with oil, and holes 7 and 7' are bored in the side wall of the cylinder 1 at the level a little above the bottom surface thereof for the purpose of permitting the piston rod to be fully displaced within the cylinder (the hole 7' serving as an alternative of hole 7 when it is closed due to the downward stroke of the auxiliary piston 21).

The piston rod 8 extends through the oil seal 11 at the top of the cylinder. The eyelet 12 is affixed to a frame of the chassis. At the lower end of the piston rod 8 and coaxially therewith is bored a valve port 13 connecting the spaces above and below the main piston 9. The rod 8 extends through the portion 9 and is fixed by means of nut 10. A piston valve 15 is inserted into the valve port 13 and the valve has a flange 14 at the lower end forming a pressure control valve, which can open the oil ports bored through the side walls of the said valve port 13, together with the oil ports 16 bored through the upper annular part of the portion 9 when the piston valve 15 is lowered. Oil flow holes 17 having a non return valve 18 to permit only upward flow of oil are provided in the inverted bottom of the main piston 9. A supporting seat 19 to hold the valve spring 20 in the condition normally compressed between the said supporting seat 19 and the pressure control valve 15 is provided at the lower part of the main piston 9.

The auxiliary piston 21 is inserted into the cylinder 1 so as to be positioned directly under the main piston 9 when it is at the neutral position, and in the inverted bottom of this auxiliary piston 21, some large oil ports 22 are bored. An upwardly acting pin 23 is provided in the centre axis of the auxiliary piston 21 and at the bottom thereof, the upper end of a compression spring 24 is fixed, so that the upward acting pin 23 exerts a loading pressure against the pressure control valve 15 when the upper surface of the auxiliary piston 21 abuts the main piston 9.

The regulating piston 25 slidably inserted into the cylinder 1, a little distance above the bottom thereof, and forming an oil damper by means of a small oil port at the bottom of the piston, supports the lower end of the compression spring 24 and holds the restoring spring 27 of somewhat less strength than that of the spring 24, between the bottom of this regulating piston and the bottom of the cylinder. In the drawing, level $a$ shows the position the bottom surface of the main piston 9 occupies when the main piston 9 comes to the neutral position with no load of a vehicle. Level $b$, shows the same with full load, level $c$ shows the position the bottom surface of the regulating piston 25 occupies when the main piston 9 is at the neutral position with no load, and level $d$ the level of the bottom of piston 25 with full load of a vehicle.

The vibration damper according to this invention with a construction as above stated acts as the following:

When the main piston 9 is inserted into the cylinder somewhat far beyond the neutral position, the compression spring 24 will be compressed in proportion to the stroke of insertion to increase the force to press the pressure control valve 15 so that a gradually increasing damping force may be developed against the expanding external force between the fixing parts 4 and 12. When the main piston 9 returns to a position a little distance above the neutral position, a small amount of damping force may be maintained by the pressure of the valve spring 20 against the pressure control valve even if no force is obtained by the compression spring 24. But when the main piston 9 returns further upwardly, it will be released at the position above the releasing point 5 because of the damping force being removed due to the enlarged internal diameter of the cylinder 1.

The maintenance of a little damping force by means of the valve spring 20 as above is for the following two purposes: The first point is to have the force weakened, when the compression spring 24 approaches the full expansion thereof and the auxiliary piston fails to work as purposed because of the resistance due to friction. The second point is to maintain the damping power at the point where the main piston is a little expanded, and off the neutral position when the vibrating external force varies, particularly for wide range, and the energy of counter action of the chassis carrying spring can not be entirely absorbed when the main piston returns to the neutral position. Further, the damping effect is released at a little higher position than the neutral position, in order to make it easy for the wheel to fall into any dent on the road surface thereby highly improving the earth contact of the wheel.

Besides, when the static load of the vehicle varies, shifting the neutral position, the regulating piston 25 is automatically moved to adjust the point of beginning the actuation of the compression spring 24. In other words, in the case the load condition of the vehicle is suddenly changed from no load to full load, and if the vehicle is at a standstill, merely the main piston 9 will enter further into the cylinder 1, whereby the regulating piston 25 will be lowered through the compression spring 24. In this case, it is desirable for the restoring spring 27 which is below the regulating piston 25 to be in a compressed state from the beginning even with no load on the vehicle, and for this reason a substantially less strong spring is preferably used as compared with the compression spring 24. It is for the above reason that when the neutral position is lowered, both the compression spring 24 and the restoring spring 27 decrease in their length, while it is desirable to have the downward stroke of the regulating piston 25 greater.

In the running state of the vehicle, the rough surface of the road tends to cause the regulating piston 25 through the main piston 9 and the compression spring 24 to vibrate. However, in such cases the regulating piston 25 rests at the mean level of the amplitude of the external vibration because the resistance of the small oil port 26 forming the oil damper is effective to prevent a sudden action of the piston.

In FIG. 3 the character of the damping effect of the device according to this invention is graphically shown. The stroke of the main piston is taken on abscissa so that the right side of the neutral position 0 shows the amount of displacement of the main piston into the cylinder. The ordinate includes the damping force which is generated by the pressure control valve against the external expanding effect. It may be seen that with no load on the vehicle as shown by the solid line, from the releasing position to the neutral position, a small but uniform damping force is maintained, and from the neutral position to the bottom end the damping force increases in proportion thereto. The vehicle in the loaded condition is shown by the dotted line, following the rightward shift of the neutral position, (the pistons move downward) due to the increase of dead weight. The line showing the damping force also makes a rightward shift in a parallel relation as indicated.

This invention provides an improvement of the oil vibration-damper such that, in addition to the fact that the main piston, in the more compressed range than the neutral position of the cylinder, has a light damping force and produces a gradually increasing damping force against the counteracting force of the carrying spring; it can perform such an effective function that, even with the neutral position of the piston stroke shifted due to the variation of the chassis loading, the damper always performs the same function, and also develops two kinds of damping force by means of the spring in double arrangement to compress the pressure control valve.

Thus, what is claimed as new and desired to be secured by Letters Patent is:

1. Oil vibration-damper for vehicles, characterized in that a main piston including a non-return valve which admits an upward flow of oil alone and an oil pressure control valve which admits a downward flow of oil alone is slidably inserted into an oil cylinder, compression spring means being disposed below said main piston and effective to apply pressure to said pressure control valve when the main piston lowers into the cylinder beyond the neutral position and engages the top of said means, a regulating piston with a small hole bored in a part thereof to constitute an oil damper inserted in the cylinder below the compression spring, and a restoring compression spring between the said regulating piston and the bottom surface of said cylinder.

2. The oil vibration-damper according to claim 1 in which the internal diameter of the cylinder is slightly enlarged from a point a little above the neutral position of the stroke of the main piston to the top thereof.

3. A shock absorber comprising a cylinder, a piston slidable in said cylinder, said piston and said cylinder being connectable to relatively movable parts to absorb shock movements therebetween, means defined in said piston permitting upward fluid flow, a pressure control valve defined in said piston permitting a downward flow of fluid, an auxiliary piston means slidable in said cylinder having a portion in contact with said pressure control valve to close the latter when the device is in a neutral position, a regulating piston disposed between said auxiliary piston means and an adjacent end wall of said cylinder, resilient means between said auxiliary piston means and said regulating piston urging said auxiliary piston into contact with said main piston, and resilient means between said regulating piston and said cylinder end wall urging said regulating piston away from said end wall, said regulating piston having means permitting the restricted passage of fluid through in said cylinder when said main piston is moved relative to said cylinder under loading conditions.

4. A shock absorber comprising an oil cylinder, a main piston slidable in said oil cylinder, said cylinder and main piston being connectable to relatively moving parts to dampen the motion between such parts, passage means defined in said main piston permitting flow in one direction, a pressure control valve defined in said piston permitting oil flow in an opposite direction when opened, an auxiliary piston contacting said pressure control valve to close the latter when the shock absorber is in a neutral unloaded position, a regulating piston in said cylinder having restricted passage means defined therein for the flow of a restricted quantity of oil therethrough, a first compression spring disposed between said auxiliary piston and said regulating piston and a second compression spring disposed between said regulating piston and the adjacent end of said cylinder.

5. A shock absorber according to claim 4, wherein said second compression spring is of lesser force than said first compression spring.

6. A shock absorber according to claim 4, including spring means on said main piston biasing said pressure control valve closed.

7. A shock absorber according to claim 4, wherein said cylinder includes a widened interior portion on the side opposite said main piston from said auxiliary and regulating piston referenced to the parts when in the neutral position.

References Cited in the file of this patent

UNITED STATES PATENTS

| 1,703,397 | Kirk et al. | Feb. 26, 1929 |
| 2,934,332 | Mercier | Apr. 26, 1960 |